United States Patent [19]

Gardziella et al.

[11] Patent Number: 5,304,225
[45] Date of Patent: Apr. 19, 1994

[54] BINDER MIXTURE

[75] Inventors: Arno Gardziella, Rudinghausen; Karl-Heinz Schwieger, Iserlohn; Peter Adolphs, Menden-Halingen; Josef Suren, Haaren; Bertold E. Meier, Menden, all of Fed. Rep. of Germany

[73] Assignee: Rutgerswerke AG, Fed. Rep. of Germany

[21] Appl. No.: 773,895

[22] PCT Filed: May 6, 1991

[86] PCT No.: PCT/EP91/00850
§ 371 Date: Oct. 25, 1991
§ 102(e) Date: Oct. 25, 1991

[30] Foreign Application Priority Data

May 15, 1990 [DE] Fed. Rep. of Germany ....... 4015440

[51] Int. Cl.$^5$ ................................................ C09K 3/14
[52] U.S. Cl. ...................................... 51/298; 524/541; 524/841
[58] Field of Search ........................... 51/298; 524/841

[56] References Cited

U.S. PATENT DOCUMENTS

| 3,510,283 | 5/1970 | McGurran | 51/295 |
| 4,251,408 | 2/1981 | Hesse et al. | 51/298 |
| 4,298,356 | 11/1981 | Teschner et al. | 51/298 |
| 4,364,746 | 12/1982 | Bitzer et al. | 51/298 |
| 4,690,692 | 9/1987 | Hesse et al. | 51/298 |

FOREIGN PATENT DOCUMENTS 59-129214 1/1984 Japan.

OTHER PUBLICATIONS

Copy of European Response–translation–Encyclopedia of Polymer Science & Engineering (2 pages).

Primary Examiner—Helene Klemanski
Assistant Examiner—Willie J. Thompson
Attorney, Agent, or Firm—Bierman and Muserlian

[57] ABSTRACT

Mixtures consisting of a phenolic resin, a hardener, and residues from bisphenol-A production in the ratio of 1:9 to 9:1 are used for the production of binder mixtures for thermostable molding materials. Usable for said purpose are binders with a minimum content of phenolic resin of 10%.

19 Claims, No Drawings

BINDER MIXTURE

The invention relates to a carbon-forming binder mixture for the production of thermostable molding materials such as refractory products and carbon materials, grinding wheels and friction linings.

Refractory products can be classified according to their chemical composition, their form, and according to manufacturing processes. According to ISO Standard 1109/78, refractory products are divided chemically into high-alumina products, fireclay products, dinas clay products, silica products, basic products and special products, e.g. carbon materials, zirconium silicate, nitrides, borides, spinels. For their further classification, refractory materials are distinguished as shaped, e.g. bricks, or unshaped products, e.g. mortar, tamming mixes, sunning materials.

ISO Standard 2246 describes a classification by manufacturing methods, with which types of bond are associated. At temperatures below 150° C. there can be used as binders e.g. clay, waterglass, cement or organic binders, such as molasses, lignin sulfonate, tar and pitch, or synthetic resins. The bonding for products which are heat-treated at 150° to 800° C. can also be inorganic-chemical (phosphates, sulfates), hydraulic (cement) or organic carbon-forming (e.g. tar, pitch, synthetic resin).

Hot-pressed grinding wheels have heretofore been made with the use of furfurol or other liquid substances as abrasive grain wetting agents, which are able only incompletely to absorb the high proportion of filler that is to be bound to the abrasive grain, and therefore highly dust-creating and unstable molding mixtures were obtained. What is wanted are ways to produce stable, storable molding material mixtures as granulates.

Friction lining mixtures are produced either by a dry method by mixing binder powders into a filler-fiber mixture, or by a wet process using aqueous liquid resin or solvent-containing resin solutions with subsequent drying. Adequate fiber and filler wetting and adhesion is often insufficient, in particular when processing asbestos-free lining mixtures.. Besides, severe dust problems arise in the dry mixing process.

While in the past mainly tars or pitches were used as starting material for proper carbon formation in the sector of carbon forming binders, e.g. for obtaining an especially good slagging resistance, at present attention is being directed to the use of hardenable synthetic resins, specifically furane and phenolic resins, as raw materials which at high temperatures lead to very little or no development of smoke and soot and at the same time improve the quality and processibility of the refractory compositions, but are rather expensive.

From EP 248 980 A1 are known binders for thermostable molding materials, consisting of such a phenolic resin with a molar ratio of phenol and formaldehyde of 1:0.2 to 1:0.55.

According to DE-PS 27 23 792, DE-OS 36 20 473 and EP 249 959 A1, also phenol-derived binders are known, for which 3 to 30% by wt residues from dimethyl terephthalate production can be used.

A disadvantage of these products, however, is their high viscosity. It can indeed be lowered by addition of solvents or oils, so that the binder can be processed in a favorable temperature range below 100° C. During heating, however, these volatile, odorous components are in part released again, whereby smoke and soot formation may be caused.

It is, therefore, the object of the invention to make available cost-effective binders equally suitable for the production of shaped and unshaped thermostable molding materials as well as for the production of carbon materials and usable under the usual conditions, which due to their property profile, without addition of solvents or oil, show on the one hand good processibility but are, on the other hand, good carbon formers even at high temperatures.

The problem is solved by the production and use of binders of the invention according to claims 1 to 19.

It has been found, surprisingly, that cost-effective binders with improved properties for thermostable molding materials can be produced when resinous residues from bisphenol-A production are mixed with a phenolic resin. These binder mixtures contain at least 10% by weight phenolic resin.

The bisphenol-A residues usable for the production of these binders, for which it was previously difficult to find an effective utilization and which for the most part had to be dumped, are resinous by-products that occur in the production of bisphenol-A by condensation of 2 mol phenol with 1 mol acetone and remain as residue after the separation of the bisphenol-A, regardless of the type of catalyst used in the condensation and of the type of purification of the bisphenol-A. In the residue of the bisphenol-A synthesis, therefore, an inexpensive raw material of advantageous properties for the production of the binder according to the invention is available.

The phenolic resins to be used according to the invention in the binder mixture are obtained by condensation of a phenolic component with an aldehyde, preferably formaldehyde, or a compound splitting off aldehyde under condensation conditions in acid medium. As phenol component is used phenol itself or its alkyl-substituted homologues, such as o-, m- or p-cresol, higher alkylated phenols, but also cresols, xylenols, longer-chain alkyl phenols, further halogen-substituted phenols, such as chloro- or bromo-phenols, or polyvalent phenols such as resorcinol or pyrocatechin. But multinuclear phenols, such as the various naphthols, 4,4-dihydroxydiphenyl methane, 2,2-bis(4-hydroxyhenyl)-propane and mixtures of said phenol components, enter into consideration also.

The molar ratio of phenol component to aldehyde is in the range of 1:0.2 to 1:0.55, preferably 1:0.25 to 0.4. At a molar phenol-aldehyde ratio in the range of 1:0.2 to 1:0.55, low-melting novolacs are obtained, which can then be processed in combination with the bisphenol-A residue as melt at a temperature of below 100° C.

Novolacs of higher molecular weight, which are obtained at a molar ratio of 1:0.7 to 1:0.9, can be mixed in the melt with the bisphenol-A residue. After cooling and solidification, the product thus obtained can be ground together with a hardener and used as powder.

As hardeners can be used compounds forming methylene groups, as e.g. paraformaldehyde or hexamethylene tetramine.

The binders according to the invention can be cross-linked with 1 to 20% by wt hardener, preferably 5 to 15% hexamethylene tetramine.

In the production of refractory compositions by means of the warm mixing process at about 80° to 120° C., a high viscosity of the binder has a disadvantageous effect on the miscibility with the mineral substances. But if the viscosity is too low, the adhesivity of the binder is no longer sufficient.

Residues from dimethylterephthalate production show a sufficiently low viscosity at which they can be mixed with the materials to be bonded only at about 125° to 130° C. At these temperatures, however, the added hardener becomes active already.

The starting viscosity of the bisphenol-A residue, on the contrary, is lower by a factor about 10 than e.g. the viscosity of residues from dimethylterephthalate production. It is therefore possible to produce suitable binders from bisphenol-A residue, possibly with substantially higher quantity proportions, and low-melting phenol novolacs entirely without addition of solvents.

Residues from the bisphenol-A synthesis, depending on their starting viscosity in the bracket of from 5,000 to 50,000 mPa.s at 75° C. in combination with the low-melting novolacs in the molar ratio phenol:formaldehyde 1:0.2 to 1:0.55, result in processing viscosities which are on the level of these novolacs or lower. Such binding mixtures can therefore be processed at temperatures under 100° C., that is, at temperatures at which the usual hardener hexamethylene tetramine does not yet react.

It was surprising to find that mixtures of bisphenol-A residues with low-melting novolacs of the above composition furnish even at higher quantity proportions of bisphenol-A residues up to 90% a starting strength level on dolomite-based test specimens comparable to pure novolac. At proportions of bisphenol-A residues up to 50% in the binder mixture of the invention, the starting level of the strength of pure novolac can be improved upon and the hydration protection and strength enhancement during the first seven days can be slightly increased or will remain comparable.

Only after longer storage times than seven days at higher proportions of bisphenol-A residues than 50% in the binder mixture does the hydration protection and the strength drop decrease clearly more than with pure low-melting novolacs.

By comparison, combinations of DMT-ester pitch (=residues from dimethylterephthalate production) or waterproofing products such as tall oil distillate or tall oil pitch (e.g. Unitol P=residue from tall oil processing) give under comparable processing conditions with the low-melting novolacs a surprisingly lower strength level with substantially poorer hydration protection and clearly shorter storage times.

In addition, the vapor development in pyrolysis processes from the binders of the invention is clearly less than for the combination of residues from dimethylterephthalate production with phenol novolacs.

Due to their property profile, the binders of the invention can readily be mixed already at about 80° to 90° C. with the other components of the thermostable molding materials. For the curing of the molding material mixture thus produced there may be added 1 to 20, preferably 5 to 15% hexamethylene tetramine, referred to the weight of the binder employed. After pressing to shaped parts and cooling, a very good green stability of these shaped parts is achieved.

Thermostable molding materials and carbon materials of satisfactory properties are obtained when at least 10% novolac are contained in the binder according to the invention. Preferably one uses in the compositions according to the invention binders with a 1:1 mixture ratio of novolac and bisphenol-A residue.

Usable binders are mixtures of novolac and bisphenol-A residues in the ratio of 1:9 to 9:1. However, mixture ratios of 2:3 to 3:2 are preferred.

Refractory compositions produced with the binders according to the invention show good storage stability and can be processed well due to the high edge rupture strength.

In practical use they show a high carbon yield and can be processed without difficulties.

Surprisingly it was found that the slag stability improves greatly when the binders according to the invention contain additionally 5 to 25% by wt of a pulverized resin.

Besides an improved slag stability, these specific pulverized resins result in an increased carbon yield of the binder mixture.

The production of these pulverized resins takes place either in the same manner as for the low-melting novolacs by melting-in of the bisphenol-A residues in the novolacs with a molar ratio of phenol to formaldehyde between 1:070 and 1:0.90, namely in a ratio of bisphenol-A residue to novolac of 3:7 to 7:3, or it takes place by condensation of the reaction partners under acid conditions, the ratio of phenol to bisphenol-A residue being able to be chosen in the range of 10:1 to 1:2.5% by weight and the molar ratio of phenol to formaldehyde being again between 1:0.70 and 1:0.9.

The pulverized resins may contain up to 20% by wt hexamethylene tetramine.

The thermostable molding materials according to the invention contain, besides the binder, the usual fillers and additives in the normally used quantities.

Examples for fillers for refractory products, which can be employed singly or in combinations, are sand, corundums, bauxites, zirconias, chromites, magnesites, dolomites, borides, but also carbon, such as carbon black, coke and graphite.

Advantageous in the application of the binders of the invention to the production of hot-pressed grinding wheels is the possibility of producing by the warm-mixing a free-flowing, dust-free, stable granulate, which is processed by hot-pressing.

In the production of friction linings, the advantages of the conventional friction lining composition preparation by dry-mixing processes and wet processes can be combined by warm-mixing processes with the use of the thermostable molding materials of the invention, i.e. high impregnation ability of the fiber components and of the other additives as well as absence of solvents and water.

Fillers for grinding wheels are corundums and silicon carbide, additives are cryolite, pyrites, fluoroborates, zinc sulfide, antimony oxide, etc.

There are used as fiber material for friction linings for example: diabase fibers, basalt, ceramic, aramide, glass, carbon and metal fibers. Further additives are: blacks, graphite, kaolin, barite, metal oxides, slate flour, sulfides and metals in the form of powders and shavings.

EXAMPLES

Example 1

9.4 kg phenol are mixed with 94 g oxalic acid and heated to 100° C. In a period of 3 hours, 2.6 kg formalin 45% are added uniformly under agitation and reflux. After completed addition, the reaction mixture is heated under reflux up to a content of free formaldehyde of <0.5% and thereafter liberated of water and monomer components phenol and formaldehyde by distillation.

The novolac thus obtained is characterized by the melt viscosity in mPa.s.

According to DIN 53229 (Plate/Cone)
at 75° C.=32,000
at 100° C.=1,250
at 125° C.=190.

Example 2

2.0 kg of the novolac per Example 1 are homogenized in the melt at 130° C. with 0.5 residues from the synthesis of bisphenol-A, obtained by condensation, catalyzed with HCl, of 2 moles phenol and 1 mole acetone with subsequent distillative separation of the bisphenol-A (bisphenol-A residue), and then cooled.

The binder mixture thus obtained is characterized by the melt viscosity in mPa.s.
According to DIN 53229 (Plate/Cone)
at 75° C.=21,500
at 100° C.=580
at 125° C.=70.

Example 3

2.0 kg of the novolac per Example 1 are homogenized at 130° C. with 2.0 kg bisphenol-A residue in the melt and then cooled.

The product thus obtained is characterized by the melt viscosity in mPa.s.
According to DIN 53229 (Plate/Cone)
at 75° C.=20,000
at 100° C.=550
at 125° C.=50.

Example 4

2.0 kg of the novolac per Example 1 are homogenized in the melt at 150° C. with 2.0 kg bisphenol-A residue and thereafter low-volatile components are removed by vacuum distillation up to a temperature of 160° C.

The product thus obtained is characterized by the melt viscosity in mPa.s.
According to DIN 53229 (Plate/Cone)
at 75° C.=31,000
at 100° C.=820
at 125° C.=110.

Example 5

0.5 kg of the novolac per Example 1 are homogenized in the melt at 130° C. with 2.0 kg bisphenol-A residue and then cooled.

The product thus obtained is characterized by the melt viscosity in mPa.s.
According to DIN 53229 (Plate/Cone)
at 75° C.=14,800
at 100° C.=350
at 125° C.=30.

Example 6

Comparison Example 2.0 kg of the novolac per Example 1 are homogenized at 130° C. with 2.0 kg DMP-ester pitch (=residue from dimethylterephthalate production) at 150° C. in the melt and then cooled.

The product thus obtained is characterized by the melt viscosity in mPa.s.
According to DIN 53229 (Plate/Cone)
at 75° C.=250,000
at 100° C.=4,500
at 125° C.=420.

EXAMPLE 7

9.4 kg phenol are mixed with 94 g oxalic acid and heated to 100° C. In a period of 3 hours, 5.0 formalin 45% are added uniformly under agitation and reflux. After completed addition, the reaction mixture is heated under reflux up to a content of free formaldehyde of <0.5% and thereafter liberated of water and monomer components phenol and formaldehyde by destillation.

The novolac thus obtained is characterized by the melt viscosity in mPa.s.
According to DIN 53229 (Plate/Cone)
at 150° C.=2800
at 175° C.=600.

To 1.4 kg of this novolac 0.6 kg bisphenol-A-residue are added in the melt at 150° C. and homogenized. More readily volatile components are removed by vaccum destillation up to a temperature of 170° C.

In this way obtained novolac is characterized by the melt viscosity in mPa.s.
According to DIN 53229 (Plate/Cone)
at 150° C.=750
at 175° C.=200.

After grinding with 10% hexamethylene tetramine a powder resin is obtained with the following characterization:

| | |
|---|---|
| Melting range in °C.: according DIN 53781 | about 95 |
| Flow at 125° C. in mm: according DIN 16916-02-A | 70 |
| Hexa-content: | 9,0 |
| Screen analysis > 45μ: according DIN 53734 | 10,0 |

Examples 8 to 13

The quantities of dolomite stated in the Table, grain size 0.3 to 3.0 mm, are heated to 90° C. in a mixer. Thereafter the respective stated quantity of binder mixture res. novolac having a temperature of approx. 130° C. is homogeneously distributed in the mixture and subsequently at a temperature of 85° to 90° C. the hardening agent hexamethylene tetramine with 10% referred to the binder is remixed.

The finished mixtures are pressed directly at 80° C. to test specimen dimensions of 140×20×20 mm and subsequently heated within 5 hours to 180° C. and thereafter maintained at this temperature for 2 hours and thus cured.

The test specimens thus obtained are tested at different intervals of time for their bending strength (according to DIN 53452).

The results obtained are found in the Table.

Examples 14 to 15

The quantities of dolomite stated in the Table, grain size 0.3 to 3.0 mm, are heated in a mixer to 90° C. Then the stated quantity of phenol novolac per Example 1 having a temperature of about 130° C. is homogeneously distributed in the mixture and subsequently remixed at the same temperature, as second component tall oil distillate or respectively Unitol(R) P (=tall oil pitch as complex mixture of unsaponifiable and high-boiling esters, fat and resin acids Manufacture: Union Camp Chemicals U.K. Ltd.). Lastly the hardening agent hexamethylene tetramine with 10% referred to the binder is remixed.

The finished mixtures are pressed directly at 80° C. to test specimen dimensions of 140×20×22 mm and thereafter heated within 5 hours to 180° C. and then maintained at this temperature for 2 hours and thus cured.

The test specimens thus obtained are tested at different intervals of time for their bending strength (according to DIn 53452).

The results obtained are contained in the Table.

ene tetramine solution, mixing for another 3 minutes while cooling.

The cooled mixture is hot-pressed to friction linings with a pressing time of 30 sec per mm layer thickness at 170° C. and postcured for 10 h to 200° C.

Testing of the friction coefficient gives a value of 0.35.

The friction value of a corresponding mixture with novolac per Example 1 instead of the mixture per Example 4 gives a value of 0.4.

TABLE

Strength values on dolomite rods as a function of binder mixture and storage time

| Example No. | 8 | 9 | 10 | 11 | 12 | 13 | 14 | 15 |
|---|---|---|---|---|---|---|---|---|
| Dolomite, grain size 0.3 to 3.0 mm | 5,000 g | 5,000 g | 5,000 g | 5,000 g | 5,000 g | 5,000 g | 5,000 g | 5,000 g |
| Binder mixture acc. to Example | 250 g / 2 | 200 g / 3 | 200 g / 5 | — | — | 200 g / 6 | — | — |
| Phenol novolac acc. to Example | — | — | — | 250 g / 1 | 200 g / 1 | — | 200 g / 1 | 200 g / 1 |
| Tall oil distillate | — | — | — | — | — | — | 50 g | — |
| Unitol ® P | — | — | — | — | — | — | — | 50 g |
| Hexamethylene tetramine | 25 g | 20 g | 20 g | 25 g | 20 g | 20 g | 25 g | 25 g |
| Bending strength (N/cmm$^2$) | | | | | | | | |
| immediately after curing | 33.3 | 29.9 | 27.9 | 30.7 | 28.5 | 9.7 | 5.1 | 6.1 |
| after 7 days | 38.5 | 27.8 | 21.0 | 37.1 | 31.9 | 7.1 | 3.0 | 4.6 |
| after 14 days | — | 17.2 | 12.0 | — | — | 4.5 | 1.1 | 1.4 |
| after 16 days | 25.8 | — | — | 30.0 | 21.8 | — | — | — |
| after 21 days | 12.8 | 6.6 | 4.1 | — | — | — | — | — |
| after 23 days | — | — | — | 16.7 | 16.5 | — | — | — |

EXAMPLE 16

600 g corundum, grain 46, are heated in an intensive mixer to 140° C. and intensively mixed with 26.5 g of a resin melt per Example 4 which had been heated to 120° C. The mixing process takes 3 minutes.

This composition is cooled to 90° C. and mixed with a mixture of 45.0 g pulverized resin per Example 7
3.5 g hexamethylene tetramine
9.0 g calcium oxide
37.5 g cryolite and mixed for another 30 to 60 seconds at 90° C., then cooled to room temperature.

From the mixture, test specimens of 140×20×22 mm are made by hot pressing for 3 minutes at 170° C., which subsequently are postcured for 2 h at 180° C.

The bending strength of these specimens is 90N/mm$^2$.

Corresponding specimens with pure novolac per Example 1 instead of the mixture per Example 4 have a bending strength of 93N/mm$^2$.

EXAMPLE 17

1.0 kg of the binder according to the invention per Example 4 is heated to 120° C. and added to a mixture heated to 100° C. consisting of:

3.0 kg steel wool
1.5 kg brass shavings
1.0 kg granulated coke
0.5 kg graphite
0.5 kg polyamide fiber (2 mm)
1.5 kg barium sulfate and
0.2 kg magnesium oxide.

The components are mixed with the binder in an intensive mixer for about 5 minutes. Then one adds to the mixture at 80° C. 0.2 kg of a 50% aqueous hexamethyl-

We claim:

1. Carbon-forming binder mixture for the production of thermostable molding materials, characterized in that it contains a mixture of phenol resin and resinous residues from bisphenol-A production.

2. Binder mixture according to claim 1, characterized in that it contains at least 10% by weight phenol resin.

3. Binder mixture according to claim 1, characterized in that bisphenol-A residue and phenol resin are contained therein in mixture ratios of 1:9 to 9:1.

4. Binder mixture according to claim 1, characterized in that bisphenol-A residue and phenol resin are contained therein in mixture ratios of 2:3 to 3:2.

5. Binder mixture according to claim 1, characterized in that bisphenol-A residue and phenol resin are contained therein in a mixture ratio of 1:1.

6. Binder according to claim 1, characterized in that as phenol resin a novolac is employed whose molar ratio of phenol to formaldehyde is 1:0.2 to 1:0.55.

7. Binder mixture according to claim 6, characterized in that it contains as additional resin a pulverized resin.

8. Binder mixture according to claim 7, characterized in that the pulverized resin is a novolac resin.

9. Binder mixture according to claim 7, characterized in that the pulverized resin is a condensation product from bisphenol-A residues, phenol and an aldehyde.

10. Pulverized resin, produced by condensation of phenol, bisphenol-A residues and formaldehyde under acid conditions.

11. Binder mixture according to claim 1, characterized in that it contains 1 to 20% by weight of a hardener.

12. Binder mixture according to claim 11, characterized in contains as hardener hexamethylene tetramine.

13. Binder mixture for the production of thermostable molding materials according to claim 1, characterized in that it has a melting point in the range of from 30° to 55° C.

14. Binder mixture according to claim 1, characterized in that it has at a temperature of 100° C. in the melt a viscosity in the range of 300 to 5,000 mPa's.

15. The binder mixtures according to claim 1 for the production of unshaped refractory compositions.

16. The binder mixtures according to claim 1 for the production of shaped refractory compositions.

17. The binder mixtures according to claim 1 for the production of carbon materials.

18. The binder mixture according to claim 1 for the production of grinding wheels.

19. The binder mixtures according to claim 1 for the production of friction linings.

* * * * *